United States Patent [19]

Phalangas

[11] 3,948,740

[45] Apr. 6, 1976

[54] POLYMERIZATION OF WATER SOLUBLE MONOMERS WITH RADIATION AND CHEMICAL INITIATOR

[75] Inventor: Charalambos J. Phalangas, Princeton Junction, N.J.

[73] Assignee: Hercules Incorporated, Wilmington, Del.

[22] Filed: May 4, 1973

[21] Appl. No.: 357,356

[52] U.S. Cl..... 204/159.23; 204/159.24; 260/80 M; 260/80.3 R; 260/80.3 N; 260/86.1 N; 260/89.5 A; 260/89.7 R; 260/89.7 N
[51] Int. Cl.².......................... C08F 2/46; C08F 4/00
[58] Field of Search...... 204/159.22, 159.23, 159.24

[56] References Cited
UNITED STATES PATENTS

| | | | |
|---|---|---|---|
| 2,941,934 | 6/1960 | Anspon | 204/159.22 |
| 3,001,922 | 9/1961 | Zimm | 204/159.22 |
| 3,090,736 | 5/1963 | Bashaw | 204/159.22 |
| 3,424,638 | 1/1969 | Marans | 204/159.22 |
| 3,681,215 | 8/1972 | Peterson | 204/159.23 |
| 3,764,502 | 10/1973 | Restaino | 204/159.22 |

*Primary Examiner*—Richard B. Turer
*Attorney, Agent, or Firm*—Michael B. Keehan

[57] ABSTRACT

Improved process for the preparation of water-soluble substantially linear, high molecular weight polymers comprising irradiating an aqueous solution of an ethylenically unsaturated monomer and a chemical, free-radical initiator under conditions to cause radiation-induced polymerization of the monomer, terminating radiation of the system when less than all the monomer has been converted to polymer and when the temperature of the system is such that the chemical, free-radical initiator dissociates with the proper rate to sustain polymerization, and continuing the polymerization to completion by the free radicals generated by the thermal decomposition of the chemical initiator. The radiation-induced polymerization is terminated before more than 95% of the monomer is converted to polymer and preferably before 90% of the monomer is converted to polymer. The remaining monomer is converted to polymer by the free radicals generated by the thermal decomposition of the chemical initiator. Reaction conditions include: monomer concentrations from 10% to 60% by weight, radiation intensities of 1,000 to 1,000,000 rads per hour, and radiation dose from 1,000 to 150,000 rads.

14 Claims, No Drawings

POLYMERIZATION OF WATER SOLUBLE MONOMERS WITH RADIATION AND CHEMICAL INITIATOR

This invention relates to a process for the preparation of water-soluble, substantially linear, high molecular weight polymers. More particularly, this invention relates to an improved process for obtaining water-soluble, substantially linear, high molecular weight polymers of ethylenically unsaturated monomers in substantially 100% yields by a process utilizing irradiation-induced polymerization and chemically initiated polymerization.

The prior art reveals a number of methods for preparing water-soluble polymers of ethylenically unsaturated monomers. For example, ethylenically unsaturated monomers have been polymerized in solution, in emulsion, and in suspension employing chemical, free-radical initiators to initiate polymerization. Solution polymerization via chemical catalyst is not practical because the polymerization cannot be carried out to high conversion and high molecular weights at practical concentrations of monomer in solution. In suspension or emulsion polymerization, the chemical catalyst is added to a mixture of organic solvent, water, monomer, suspending or emulsifying agents, and, optionally, a polymer precipitant. By these techniques, it is possible to obtain high conversion of monomer to polymer in products of high molecular weight. However, the polymer must be separated from excess quantities of solvent and additives in order to obtain the product in useful form. Moreover, chemically catalyzed polymerizations require careful control of polymerization temperature to avoid decreases in molecular weight or premature cross-linking and insolubilization of the polymer. In order to achieve practical levels of conversion, molecular weight, and water-solubility, the rate of such polymerizations must generally be controlled to require reaction periods of several hours, usually from several hours to several days.

In recent years, attention has been focused on the polymerization of ethylenically unsaturated monomers under the influence of high energy ionizing radiation, for example, gamma radiation. Numerous processes have been developed for the preparation of water-soluble, substantially linear, ultra-high molecular weight polymers of ethylenically unsaturated monomers. One disadvantage of these radiation-induced polymerization processes, however, has been that at the higher monomer concentrations and lower radiation intensity required to produce the high molecular weight polymers, the polymerization process must be terminated before all the monomer has been converted to polymer in order to avoid undesirable amounts of branching and cross-linking of the polymer chains which results in the formation of water-insoluble polymers. This branching and cross-linking of the polymer to form water-insoluble products occurs because the number of free radicals formed directly or indirectly by irradiation of the polymer molecules increases as the polymer concentration in the irradiated solution increases, and therefore, the probability of two of these polymer radicals finding each other in close proximity to react and form linkages between the polymer molecules is greater, and because the rate of polymerization decreases as the monomer to polymer conversion increases, and therefore the radiation dose required per unit of percent conversion increases. In most cases the radiation dose required to convert the last few percentage points of monomer to polymer is a significant portion of the total radiation dose. Such a big radiation dose delivered to the polymerization system at a time when the polymer concentration is high will cross-link the polymer and result in the formation of water-insoluble products. Therefore, if radiation alone is used for the synthesis of very high molecular weight, water-soluble polymers from concentrated aqueous solutions, the polymerization reaction must be stopped short of complete conversion if cross-linking and insolubilization of the polymer is to be avoided.

It is also known in the prior art to irradiate an aqueous solution of monomer and chemical, free-radical initiator so that radiation-induced polymerization and chemical initiatorinduced polymerization occur simultaneously. For the reasons given above, continuation of these reactions until complete conversion of monomer to polymer is obtained, will result in highly branched, cross-linked, water-insoluble products or in low molecular weight products. See, in connection with the polymerization of ethylenically unsaturated monomers using a combination of radiation and chemical, free-radical initiators, the discussion in U.S. Pat. Nos. 2,891,025; 3,036,086; 3,114,419; and 3,001,922.

In accordance with the present invention it has been found that very high molecular weight, substantially linear, water-soluble polymers at conversion of monomer to polymer levels of substantially 100% by a process which comprises irradiating an aqueous solution containing a small amount of a chemical, free-radical initiator wherein the radiation-induced polymerization is terminated before all the monomer is converted to polymer and the polymerization is continued to completion exclusively by the free radicals generated by the thermal decomposition of the chemical, free-radical initiator present in the system. As more fully set forth hereinafter, the chemical, free-radical initiator and the conditions of the radiation-induced polymerization are chosen so that at the time the irradiation is stopped the temperature of the system is such that the initiator dissociates with the proper rate to sustain the polymerization and carry it to almost theoretical completion within a reasonable time.

The heat liberated by the radiation-induced polymerization reaction brings the temperature of the system to the level required to generate free radicals from the chemical initiator. By controlling the monomer concentration of the solution and the radiation conditions, one may start from any practical temperature and reach the temperature at which the chemical initiator generates free radical at the desired rate.

The chemical, free-radical initiator employed in the process of the present invention may be any of those initiators known in the art, provided the effective temperature range of the initiator, that is, the temperature range at which the initiator has an appreciable dissociation rate constant, may be reached not long before termination of the radiation-induced polymerization. If the effective temperature range of the chemical initiator is reached too long before the irradiation is stopped, large amounts of initiator have to be added from the start of the reaction so that when the irradiation is terminated sufficient initiator will be left in the system to carry the polymerization to completion. Large amounts of chemical initiators in solution may contribute a significant number of free radicals during irradiation and may therefore result in polymers of lower molecular weight than those obtained with a smaller amount of chemical initiator. Termination of radiation before completion of the polymerization is very important in obtaining substantially linear, water-soluble, high molecular weight polymers in high yields. When the polymer concentration in the irradiated system becomes high, branching and cross-linking of the polymer occurs due to the large number of free radicals produced by the radiation on the polymer. Accordingly, in selecting an appropriate free-radical initiator, one is chosen which does not become effective with an appreciable rate until near the end of irradiation.

The chemical, free-radical initiators employed in the process of this invention are not substantially effective at temperatures below about 50°C. and have a dissociation rate constant of at least $1 \times 10^{-4}$ reciprocal seconds at 100°C. Illustrative examples of chemical, free-radical initiators meeting these two criteria include azo compounds, such as azo-bisisobutyronitriles (AZBN), for example, 2,2'-azo-bis(2-methyl propionitrile); 4,4'-azo-bis(4-cyanovaleric acid); 2,2'-azo-bis(2,4-dimethyl valeronitrile); and 2,2'-azo-bis(2-cyclopropyl propionitrile); 2,2'-azo-bis(2-cyclobutyl propionitrile); 2,2'-azo-bis(2-cyclobutyl propionitrile); 2,2'-azo-bis(2,4-dimethyl valeronitrile); 1,1'-azo-bis(1-cycloheptanenitrile); 2,2'-azo-bis(methylheptylonitrile); 2,2'-azo-bis(2-cyclohexyl propionitrile); azo-bis-isobutyramidine 2HCl; phenyl-azo-triphenylmethane; 4-hydroxyphenyl-azo-triphenylmethane; peroxide compounds, such as benzoyl peroxide, tertiary-butyl peroxy pivalate; and acetyl peroxide; propionyl peroxide; 2-isopropionyl peroxide; butyryl peroxide; 2-methoxybenzoyl peroxide; 4-benzylidenebutyryl peroxide; methyl phtholoyl peroxide; diethyl peroxydicarbonate; ethyl tertiary-butyl peroxalate; benzyl (tertiarybutyl peroxy) oxalate; tertiary-butyl-N-(3-tolylperoxy) carbamate; and persalt compounds, such as potassium persulfate. The amount of chemical, free-radical initiator used is from 5 to 5,000 ppm and preferably from 15 to 300 ppm. Water-soluble chemical, free-radical initiators may be added directly to the aqueous monomer solution or dissolved in a small amount of water and then added to the aqueous monomer solution. Initiators which are substantially insoluble in water may be dissolved in a small amount of an organic solvent and then dispersed in the aqueous monomer solution.

As discussed above, the process of this invention is carried out in such a way that the temperature at which the chemical, free-radical initiator is split with the desired half-life is reached at about the time the irradiation is terminating so that the smallest possible overlap of radiationinduced and chemical initiator-induced polymerization occurs. The precise point at which the radiation-induced polymerization is terminated depends somewhat on the reaction conditions employed, but, in general, it may be said that the radiationinduced polymerization is terminated prior to the formation of water-insoluble polymer. In general, the higher the molecular weight of the polymer being formed the more careful one has to be to avoid cross-linking and insolubilization of the polymer. As a guideline, the radiation-induced polymerization reaction is terminated by withdrawing the sample from the source of gamma rays before the monomer to polymer conversion has reached more than 95% and preferably when it is not more than 90%. The minimum percent conversion of monomer to polymer with radiation is the percent conversion which will bring the temperature of the system to the temperature required to dissociate the initiator at a sufficient rate to sustain and substantially complete the polymerization reaction. The radiation has been terminated at monomer to polymer conversions as low as 30%. In most cases, the radiation-induced polymerization reaction is continued until the monomer to polymer conversion is at least 50% by weight.

The radiation-induced polymerization is effected, in accordance with this invention, by subjecting an aqueous solution of at least one ethylenically unsaturated monomer to high energy ionizing radiation. The radiation employed may be particulate or electromagnetic in nature, and includes accelerated electrons, protons, neutrons, etc., as well as X-rays and gamma rays.

The polymers of the invention may be prepared from water-soluble monomers conforming to the formula

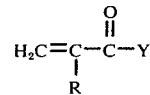

mixtures of such monomers, or water-soluble mixtures of such monomers with other ethylenically unsaturated monomers. In the formula, R represents hydrogen, methyl, or ethyl and Y represents —NH$_2$, —OM,

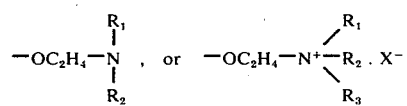

wherein M is hydrogen, H$_4$N$^+$, alkali metal, or any other cation yielding a water-soluble compound, R$_1$, R$_2$, and R$_3$ are 1 to 4 carbon alkyl radicals and X is an anion. Illustrative examples of monomers conforming to the formula include acrylamide, methacrylamide, acrylic and methacrylic acids and their water-soluble salts, such as their alkali metal salts, dimethylaminoethyl acrylate and dimethylaminoethyl methacrylate and the products of their quaternization with dimethyl sulfate, diethyl sulfate, methyl chloride and ethyl chloride. Preferred nitrogen-bearing monomers within the above formula are acrylamide, methacrylamide, dimethylaminoethyl acrylate quaternized with dimethyl sulfate or diethyl sulfate and dimethylaminoethyl methacrylate quaternized with dimethyl or diethyl sulfate. The invention also contemplates polymers obtained by polymerizing mixtures of monomers conforming to the foregoing formula as well as water-soluble mixtures of such monomers with other ethylenically unsaturated monomers, for example, 1-vinylimidazole and its quaternary salts, 1-vinyl-2-methylimidazole and its quaternary salts, acrylonitrile, vinyl sulfonic acid and its alkali metal salts, and the like, provided the mixture of monomers contains less than 5% by weight of 1-vinylimidazole, a salt of 1-vinylimidazole with an acid, such as sulfuric acid or hydrochloric acid, or a quaternary salt of 1-vinylimidazole.

By selection of monomer combinations, polymers may be obtained which are nonionic, cationic, anionic, or ampholytic as desired. By way of illustration, acrylamide yields an essentially nonionic polymer, the quaternary salts of dimethylaminoethyl acrylate or dimethylaminoethyl methacrylate yield cationic polymers, copolymers of acrylamide with acrylic acid or with quaternized acrylic or methacrylic amine salts, are anionic or cationic, respectively, while terpolymers of acrylamide with both acrylic acid and the quaternary compounds are ampholytic. Acrylonitrile is, by itself, relatively insoluble in water; but mixtures thereof with the water-soluble monomers above-characterized containing up to 25% acrylonitrile are soluble and may be employed. When monomer mixtures are polymerized in accordance with the invention, the said mixtures contain at least 15% by weight of one or more monomers, according to the aforesaid formula.

Irradiation of the monomer is carried out in an aqueous solution containing about 10% to about 60%, and preferably about 15% to about 45% by weight of dissolved monomer. At the lower concentrations of monomer, the product is generally a pourable polymer solution; at concentrations of above about 15% by weight, the product is generally a nonpourable gel. The use of monomer concentrations below about 10% tends to be uneconomical and the use of monomer concentrations much above about 60% tends to result in the formation of water-insoluble products. Of course, the particular limits of monomer concentration vary somewhat with the particular monomers used and the radiation conditions used; but, in general, values within the ranges stated are satisfactory. It has been found that provided all other variables are kept constant, the intrinsic viscosity of the polymer product increases as the monomer concentration increases.

The intensity of radiation has an effect on the molecular weight of the polymer product obtained and consequently on the intrinsic viscosity of its solutions. In general, the higher molecular weight products are obtained at the lower intensities of radiation. That is, under otherwise identical conditions, the intrinsic viscosity of the polymer tends to increase as the intensity of the radiation used decreases. On the other hand, the degree of conversion which can be obtained before an undue degree of insolubilization takes place is greater at higher intensities of radiation. In view of these considerations, it is usually desirable to employ radiation intensities of at least 1,000 rads and preferably of at least 5,000 rads per hour. While desirable high molecular weight, water-soluble polymers may be obtained with radiation intensities as high as one megarad per hour, to obtain the significantly higher molecular weight polymers of this invention, values below about 200,000 rads per hour are desirable; and for producing polymers having molecular weights in the highest range, it is preferred that values below about 100,000 rads per hour be employed.

The radiation dose may influence the water-solubility of the polymer, as it has been found that too high a radiation dose may render the resulting polymer water-insoluble. It has also been found that under otherwise identical conditions, the intrinsic viscosity of the polymer tends to increase as the total dose increases. Accordingly, the total radiation dose to which the polymerization system is subjected must be carefully chosen. The particular radiation dose used will depend somewhat on the radiation intensity used, the monomer concentration, the particular monomers employed, and on the desired intrinsic viscosity of the polymer to be produced. The minimum dose should be that adequate to polymerize enough monomer so that the heat of the reaction will bring the temperature of the mixture to the temperature at which the chemical initiator splits with the required rate to continue and complete the polymerization after irradiation is terminated. Although lower dose may be used, it is generally preferred to use a dose of at least 1,000 rads. The upper limit of radiation dose is that which produces substantial amount of water-insoluble products. In general, radiation doses as high as 150,000 rads may be successfully employed. However, for most practical purposes, dosages up to about 40,000 rads and preferably up to about 15,000 rads are employed.

The variables of radiation intensity, total radiation dose, and monomer concentration discussed above are interdependent variables. While useful polymers may be prepared at all monomer concentrations, radiation intensities, and radiation dosages within the ranges given heretobefore, all combinations of concentration, dose, and intensity within these ranges may not be used to prepare the water-soluble, high molecular weight polymers. In view of this interdependency of intensity, dose, and monomer concentration, it may be necessary to perform a limited amount of experimentation in order to prepare a polymer having the desired water solubility and intrinsic viscosity. However, this experimentation may be kept to a minimum in view of the disclosure in the numbered examples given hereinafter showing the preparation of a variety of polymers of different intrinsic viscosities and in view of the discussion herein of the effect of intensity, dose, and monomer concentration on the water-solubility and intrinsic viscosity of the polymer. For example, a polymer having an intrinsic viscosity of about 20 deciliters per gram in 2 normal sodium chloride solution at 25.5°C. may be prepared using the reaction conditions employed in Example 1 for the preparation of a polymer having an intrinsic viscosity of 21.5 except that the intensity is increased and/or the monomer concentration is lower.

The radiation-induced polymerization reaction may be conducted over a rather wide range of pH. However, it is preferable to avoid the use of very low pH values because some production of undesirable, insoluble products tends to take place if the pH is unduly lowered, particularly with acrylamide base products. On the other hand, very high pH values may result in some hydrolysis and modification of the monomer being reacted, this again being particularly true of acrylamide. Although the particular range will depend to some degree on the particular monomer composition being treated, it may be stated in general that pH values of about 3 to 13 are satisfactory. A preferred pH range for the preparation of anionic polymers is from about 8 to about 11. A preferred pH range for the preparation of cationic polymers is from about 3 to about 8.

When the radiation-induced polymerization reaction has continued to the point where the temperature of the system is at a temperature sufficient to cause dissociation of the chemical, free-radical initiator and thereby initiate and sustain chemically induced free-radical polymerization, the radiation-induced polymerization reaction is terminated by removing the system from the influence of the high intensity radiation. Due to the fact that polymerization reactions are exothermic and that sufficient temperature has been reached to induce chemically initiated polymerization, the latter polymerization will continue until substantially all of the monomer has been converted to polymer.

The product of the process of this invention is an aqueous solution of the water-soluble polymer, which may be in the form of a pourable liquid or a nonpourable, rubbery gel, depending upon the polymer concentration and the intrinsic viscosity of the polymer. The bulk viscosity of the polymer solution tends to increase as the polymer concentration and intrinsic viscosity of the polymer increases. The polymer solutions produced, in accordance with this invention, may be admixed with water and used directly or the polymer solution may be concentrated by conventional means or it may be recovered in particulate form, for example, powder form. For example, a nonpourable gel may be finally subdivided and the water removed by conventional drying techniques or the water may be extracted from the subdivided gel with a water-miscible, volatile organic liquid which has no affinity for the copolymer, for example, methanol.

The polymers prepared by the process of this invention are substantially linear, water-soluble, high molecular weight polymers. A preferred class of such polymers may be characterized as having a Huggins constant of not more than about 0.8, and generally from 0 to about 0.5, and an intrinsic viscosity of at least about 5 deciliters per gram, and generally from about 10 to 30 deciliters per gram. For purposes of this application, the intrinsic viscosity of nonionic polymers and polymers having an anionic content of below 85% are measured in two normal sodium chloride solution at 25.5°C. and the intrinsic viscosity of polymers having an anionic content of from 85% to 100% are measured in two normal sodium hydroxide solution at 25.5°C. When the intrinsic viscosity of the polymer is measured in water without the presence of salt or sodium hydroxide, values obtained are higher, particularly in the case of ionic polymers and polymers having an intrinsic viscosity of about 10. The Huggins constant of a polymer is a measure of the degree of branching of the polymer. For two polymers having similar molecular weight but different Huggins constant, the lower Huggins constant indicates a more linear polymer. Briefly, the Huggins constant of a polymer, and thus the amount of branching, may be measured from a determination of the plot of the specific viscosity versus the concentration. The slope of this curve divided by the square of the intrinsic viscosity yields the Huggins constant. A more detailed definition of Huggins constant and method for determining Huggins constant of a polymer is found in "Textbook of Polymer Chemistry," Billmeyer, Interscience Publishers, New York, 1957, pages 125–139.

The invention will be better understood from a consideration of the following examples which are presented for illustrative purposes and are not to be considered as defining or limiting the scope of this invention. All parts and percentages are by weight unless otherwise specified. The intrinsic viscosities reported are measured in 2 normal sodium chloride solution at 25.5°C., unless otherwise stated.

EXAMPLE 1

18 pounds, 11 ounces of deionized water are added to a 10 gallon polyethylene container. 556.5 grams of sodium hydroxide pellets are dissolved in the water and the resulting sodium hydroxide solution is cooled to room temperature. 1002 grams of glacial acrylic acid are added and the resulting sodium acrylate solution cooled to about 30°C. 5 pounds, 6 ounces of acrylamide are dissolved in sodium acrylate solution and the pH of the final solution adjusted to 9.5 with concentrated sodium hydroxide solution. 12.5 pounds of this solution are added to a cylindrical reaction vessel, 5 inches in diameter and 2 feet long, and 0.566 grams of 2,2'-azo-bis(2-methyl propionitrile), 100 ppm based on solution weight, are added and dispersed well by stirring. The solution is then flushed with nitrogen inside the reaction vessel for 20 minutes and the solution irradiated with gamma rays from a cobalt 60 source for 16 minutes at a radiation intensity of 20,000 rads per hour. The temperature of the solution is about 70°–80°C. The reaction product is removed from the radiation source and the polymerization induced by the presence of the 2,2'-azo-bis(2-methyl propionitrile) allowed to continue. The reaction product is allowed to stand until it has cooled to room temperature. The monomer to polymer conversion is 98.5%. A portion of the gel is extruded and a weighed amount of the gel strands are added to a beaker containing methanol. The polymer strands are allowed to stand in the methanol overnight. The strands are then ground on a Wiley mill using a 20 mesh screen. The ground product is slurried in methanol, filtered by vacuum filtration, washed three times on a filter with fresh methanol, and partially dried on the filter. The semi-dried powder is then dried in a vacuum oven for 24 hours at 36°C. The dried polymer powder is soluble in distilled water and has an intrinsic viscosity of 21.5 deciliters per gram.

EXAMPLE 2

0.84 grams of 2,2'-azo-bis(2-methyl propionitrile) are dispersed in 12.5 pounds of an aqueous solution containing 30% by weight of a mixture of 65% acrylamide and 35% sodium acrylate. The solution is prepared and irradiated in accordance with the procedure of Example 1, except that the sample is irradiated at an intensity of 20,000 rads per hour for 10 minutes. The temperature of the solution is about 75°C. After irradiation, the sample is left to cool inside the reaction vessel. The final monomer to polymer conversion is 97.8%. The polymer is soluble in water and has an intrinsic viscosity of 22.4 deciliters per gram.

EXAMPLE 3

A solution containing 57 pounds, 1.5 ounces deionized water, 206 grams sodium hydroxide, 368 grams acrylic acid, and 20 pounds, 2.5 ounces acrylamide are prepared in accordance with the procedure of Example 1 and the pH of the solution adjusted to 9.5. 15 pounds of this solution are placed in a cylindrical reaction vessel. 1.02 grams of 2,2'-azo-bis(2-methyl propionitrile) are dissolved in 15 grams of methanol and the solution slowly poured into the 15 pounds of monomer solution under stirring. The addition of the chemical initiator as a methanol solution results in its complete and homogeneous dispersion in the monomer solution. The sample is then flushed with nitrogen and irradiated with gamma rays from a cobalt 60 source for 8 minutes at an intensity of 20,000 rads per hour. The product is then allowed to cool to room temperature. The polymerization product is a nonpourable, rubbery gel and the monomer to polymer conversion is 99.8%. Both the rubbery gel and polymer powder recovered from the gel are soluble in distilled water. The polymer has an intrinsic viscosity of 21.2 deciliters per gram.

EXAMPLE 4

1.02 grams of 2,2'-azo-bis(2-methyl propionitrile) are dissolved in 15 grams of methanol and added to 15 pounds of an aqueous monomer solution having a pH of 9.4 and containing 27% by weight of a mixture of 80% acrylamide and 20% sodium acrylate. The solution is then subjected to gamma radiation at an intensity of 20,000 rads per hour for 8.0 minutes. The temperature of the solution of the partially polymerized polymer is about 70°–80°C. The product is then removed from the presence of the gamma rays and polymerization allowed to continue until 99.2% of the monomers are converted to polymer. The resulting nonpourable, rubbery gel of polymer and polymer powder recovered therefrom are water soluble. The intrinsic viscosity of the polymer is 22.8 deciliters per gram.

EXAMPLE 5

3,800 ml deionized water, 1,000 ml of a 40% by weight aqueous solution of the dimethyl sulfate quaternary salt of dimethyl amino ethyl acrylate, and 1,212 grams of acrylamide are added to a 5 gallon vessel in the order listed. The pH of the solution is 3. 0.95 grams of 2,2'-azo-bis(2-methyl propionitrile) are dissolved in 15 grams of methanol and the methanol solution poured slowly into the monomer solution with stirring. The monomer solution is then irradiated for 12 minutes with gamma rays from a cobalt 60 source at an intensity of 20,000 rads per hour. The solution has a temperature of about 80°C. The radiation-induced polymerization is then discontinued. The chemical catalyzed polymerization continues until 99.5% of the monomers are converted to polymer. The resulting polymer is water soluble and has an intrinsic viscosity of 17.0 deciliters per gram.

EXAMPLE 6

78 pounds, 13.5 ounces of deionized water are added to a 20 gallon polyethylene container. 2 pounds, 9 ounces of sodium hydroxide pellets are dissolved in the water and the resulting sodium hydroxide solution cooled to room temperature. 4 pounds, 9.5 ounces of glacial acrylic acid are added and the resulting solution cooled to 34°C. 14 pounds of acrylamide are then dissolved in this solution. The temperature of the solution is adjusted to 24°C., and the pH of this solution adjusted to 9.5 with concentrated sodium hydroxide. 1.021 grams of 2,2'-azo-bis(2-methyl propionitrile) are dissolved in 15 grams of methanol and added to 15 pounds of the monomer solution. The solution is then placed in a reaction vessel and flushed with nitrogen for 25 minutes. The solution is then irradiated for 10 minutes with gamma rays from a cobalt 60 source at a radiation intensity of 110,000 rads per hour. The irradiated solution is then removed from the gamma source and has about 89.3% of the monomer converted to polymer. The temperature of the solution is 70°C. to 80°C. The product is then permitted to stand in the reaction vessel until the chemically induced polymer cools to room temperature. The monomer to polymer conversion at this time is about 98.6% by weight, based on the weight of total monomer originally present in the solution. A portion of the gel is extruded and a weighed amount of the gel strands hardened in an excess of methanol. The hardened strands are ground on a Wiley mill using a 20 mesh screen. The ground product is slurried in methanol, suction filtered, and dried in a vacuum for 24 hours at 36°C. The resulting polymer has an intrinsic viscosity of 10.8 deciliters per gram and is soluble in distilled water.

EXAMPLE 7

Example 6 is repeated except that 4,4'-azo-bis(4-cyano-valeric acid) is substituted for the 2,2'-azo-bis(2-methyl propionitrile) chemical, free-radical initiator. The monomer to polymer conversion at the end of the radiation-induced polymerization reaction is about 89.3% and the monomer to polymer conversion of the final product is about 98.8%. The resulting polymer is soluble in water and has an intrinsic viscosity of 11.0 deciliters per gram.

EXAMPLE 8

Example 6 is repeated except that 2,2'-azo-bis(2,4-dimethyl valeronitrile) is substituted for the 2,2'-azo-bis(2-methyl propionitrile) chemical, free-radical initiator. The resulting polymer is soluble in water and has an intrinsic viscosity of 12.2 deciliters per gram.

EXAMPLE 9

55 pounds, 15.5 ounces of deionized water are added to a 20 gallon polyethylene container. 2 pounds, 5 ounces sodium hydroxide pellets are dissolved in the water and the resulting sodium hydroxide solution cooled to room temperature. 4 pounds, 2 ounces of acrylic acid are added and the resulting solution cooled to 34°C. 12 pounds, 9.5 ounces of acrylamide are dissolved in this solution and the temperature adjusted to 24°C. and the pH to 9.5. 1.021 grams of 2,2'-azo-bis(2-methyl propionitrile) are dissolved in 15 grams of methanol and the resulting solution added to a 15 pound sample of the monomer solution. The solution is then placed in a reaction vessel and flushed with nitrogen for 25 minutes using a flow rate of 5 liters per minute. The solution is then irradiated for 9 minutes with gamma rays from a cobalt 60 source at an intensity of 110,000 rads per hour. The resulting product is a nonpourable, rubbery gel and has a monomer to polymer conversion of 89.1%. The temperature of the gel is 70°C to 80°C. The rubbery gel is then removed from the influence of gamma rays and the chemically induced polymerization allowed to continue by allowing the gel to stand until it is cooled to room temperature. The monomer to polymer conversion at this point is 99.5%. The polymer is soluble in water and has an intrinsic viscosity of 15.6 deciliters per gram.

EXAMPLE 10

Example 9 is repeated except that 4,4'-azo-bis(4-cyanovaleric acid) is substituted for the 2,2'-azo-bis(2-methyl propionitrile). The final monomer to polymer conversion is 100% and the polymer has an intrinsic viscosity of 16 deciliters per gram.

EXAMPLE 11

Example 9 is repeated except that 2,2'-azo-bis(2,4-dimethyl valeronitrile) is substituted for the 2,2'-azo-bis(2-methyl propionitrile). The final product has a monomer to polymer conversion of 100% and the polymer has an intrinsic viscosity of 14.5 deciliters per gram.

EXAMPLE 12

Example 9 is repeated except that benzoyl peroxide is substituted for the 2,2'-azo-bis(2-methyl propionitrile). The final product has a monomer to polymer conversion of 93.8% and the polymer has an intrinsic viscosity of 15.6 deciliters per gram.

EXAMPLE 13

A solution containing 62 pounds. 7 ounces of deionized water, 3 pounds, 7 ounces of sodium hydroxide, 6 pounds, 3.5 ounces of acrylic acid, and 18 pounds, 14.5 ounces of acrylamide are prepared in accordance with the procedure of Example 6. 1.021 grams of 2,2'-azo-bis(2-methyl propionitrile) are added to a 15 pound portion of the monomer solution. The resulting solution is then placed in a reaction vessel and flushed with nitrogen. The monomer solution is then irradiated for 8 minutes with gamma rays from a cobalt 60 source at an intensity of 20,000 rads per hour. The reaction product is then removed from the influence of gamma radiation. The product is hot, as the radiation-induced polymerization is an exothermic reaction. The monomer to polymer conversion is about 54.4% by weight. The hot samples are allowed to react for 1 hour after irradiation, at which time the product is cooled to room temperature and powdered polymer recovered from the gel product. The monomer to polymer conversion at this point is 100% and the polymer has an intrinsic viscosity of 21.5 deciliters per gram.

EXAMPLE 14

Example 13 is repeated except that 4,4'-azo-bis(4-cyanovaleric acid) is substituted for the 2,2'-azo-bis(2-methyl propionitrile). The final product of the monomer to polymer conversion is 100% and the polymer has an intrinsic viscosity of 22.0 deciliters per gram.

EXAMPLE 15

Example 13 is repeated except that 2,2'-azo-bis(2,4-dimethyl valeronitrile) is substituted for the 2,2'-azo-bis(2-methyl propionitrile). The final monomer to polymer conversion is 99.7% and the polymer has an intrinsic viscosity of 21.5 deciliters per gram.

EXAMPLE 16

Example 13 is repeated except that tertiary butyl peroxy pivalate is substituted for the 2,2'-azo-bis(2-methyl propionitrile). The final product has a monomer to polymer conversion of 98.8% and the polymer has an intrinsic viscosity of 21.5 deciliters per gram.

EXAMPLE 17

A solution containing 46 pounds, 0.5 ounce of deionized water, 1 pound, 11 ounces of sodium hydroxide, 3 pounds, 0.5 ounce glacial acrylic acid, and 9 pounds, 4 ounces of acrylamide is prepared in accordance with the procedure of Example 6. 0.340 gram of 2,2'-azo-bis(2-methyl propionitrile) is added to a 15 pound sample of the monomer solution. The monomer solution is placed in a reaction vessel and flushed with nitrogen. The monomer solution is then irradiated for 26 minutes with gamma rays from a cobalt 60 source at an intensity of 20,000 rads per hour. The resulting hot (80°C.) polymer solution is removed from the influence of the gamma radiation and found to have a monomer to polymer conversion of 91.6%. The polymerization induced by the chemical initiator is allowed to continue until the product is cooled to room temperature. The cooled product has a monomer to polymer conversion of 93.2% and the polymer has an intrinsic viscosity of 23.7 deciliters per gram.

EXAMPLE 18

Example 17 is repeated except that 4,4'-azo-bis(4-cyanovaleric acid) is substituted for the 2,2'-azo-bis(2-methyl propionitrile). The final product has a monomer to polymer conversion of 100% and the product has an intrinsic viscosity of 22.3 deciliters per gram.

EXAMPLE 19

Example 17 is repeated except that tertiary butyl peroxy pivalate is used as the chemical-free radical initiator. The final product is completely free of monomer and the polymer formed has an intrinsic viscosity of 21.8 deciliters per gram.

EXAMPLE 20

A solution containing 66 pounds, 3.5 ounces deionized water, 2 pounds, 14 ounces sodium hydroxide, 5 pounds, 2.5 ounces acrylic acid, and 15 pounds, 12 ounces acrylamide is dissolved in water and the pH adjusted to 9.5 in accordance with the procedure set forth in Example 6. 30 pounds of the monomer solution are treated with a sufficient amount of 2,2'-azo-bis(2-methyl propionitrile) to furnish 150 ppm of the initiator based on the total weight of the sample. The monomer solution is then placed in a reaction vessel, flushed with nitrogen, and irradiated for 10 minutes with gamma rays at an intensity of 20,000 rads per hour. The monomer to polymer conversion is about 61.9%. The temperature of the solution is about 75°C. The product is then allowed to stand until it has cooled to room temperature. The final product has a monomer to polymer conversion of about 95.5% and the polymer produced has an intrinsic viscosity of 23.2 deciliters per gram.

EXAMPLE 21

Example 20 is repeated except that 4,4'-azo-bis(4-cyanovaleric acid) is used as the chemical, free-radical initiator. The final product has a monomer to polymer conversion of 95.1% and the final polymer has an intrinsic viscosity of 24.3 deciliters per gram.

EXAMPLE 22

To a 5 gallon polyethylene vessel provided with a cooling coil and stirrer, 3,470 grams of water and 1,500 grams of glacial acrylic acid are added. To the acrylic acid solution 830 grams of NaOH pellets are added slowly under continuous stirring and cooling. The pH of the resulting sodium acrylate solution is adjusted to 10.0 and the solution is cooled to room temperature (23°–25°C.). Subsequently, 1.74 grams of 4,4'-azo-bis(4-cyanolvaleric acid) are added to the solution. The solution is then flushed for 20 minutes with prepurified $N_2$ and irradiated for 24 minutes at 9,000 rads per hour. The irradiation of the solution is discontinued and the chemically induced polymerization allowed to continue and the polymer allowed to cool to room temperature.

The water-soluble, high molecular weight polymers produced by the process of this invention may be employed in any process where water-soluble, high molecular weight polymers are presently used. Polymers produced by the process of this invention are particularly suitable for use as flocculating agents, viscosity control agents in aqueous solutions and as mobility control agents in flood water for the recovery of crude oil from subterranean reservoirs.

Although the process of this invention has been described with reference to specific reaction conditions and reactants, it will be apparent that still other different and equivalent reactants and process conditions may be substituted for those specifically described, all within the spirit and scope of this invention.

I claim:

1. A process of preparing water-soluble, substantially linear, high molecular weight polymers which comprises irradiating an aqueous solution comprising from about 10% to about 60% by weight of (1) at least one water-soluble, ethylenically unsaturated monomer conforming to the formula

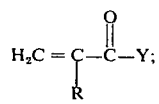

wherein R is hydrogen, methyl, or ethyl and Y is $-NH_2$, $-OM$,

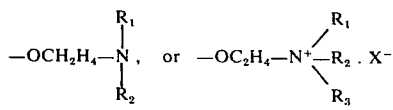

wherein M is a cation, $R_1$, $R_2$, and $R_3$ are 1 to 4 carbon alkyl groups, and X is an anion, and from about 5 to about 5,000 ppm of a chemical, free-radical initiator for the polymerization of ethylenically unsaturated compounds, said initiator having a dissociation rate constant above about $1 \times 10^{-4}$ reciprocal seconds at 100°C., does not substantially catalyze the polymerization of ethylenically unsaturated monomers at temperatures below about 50°C., and does substantially catalyze the polymerization of ethylenically unsaturated monomers at temperatures below about 100°C., with high energy ionizing radiation at an intensity of from about 1,000 rads to about 1,000,000 rads per hour to a dose of from about 1,000 to about 150,000 rads, to form a reaction mass in which from about 30% to about 95% by weight of the water-soluble ethylenically unsaturated monomer initially present in aqueous solution has been converted to water-soluble polymer and in which chemically induced polymerization occurs, terminating the high energy ionizing radiation of the reaction mass before formation of water-insoluble polymer in the reaction mass, and allowing the chemically induced polymerization of the reaction mass to continue.

2. A process of claim 1 wherein the radiation intensity is from about 5,000 to about 200,000 rads per hour and the radiation dose is from about 1,000 to about 40,000 rads.

3. A process of claim 1 wherein the radiation intensity is from about 5,000 to about 100,000 rads per hour and the radiation dose is from about 1,000 to about 15,000 rads.

4. A process of claim 1 wherein M is alkali metal, $-H$, or $-NH_4$.

5. A process of claim 1 wherein the aqueous solution contains at least one monomer selected from the group consisting of acrylamide and methacrylamide and at least one monomer selected from the group consisting of alkali metal and ammonium salts of acrylic acid and alkali metal and ammonium salts of methacrylic acid.

6. A process of claim 5 wherein the ethylenically unsaturated monomer is a mixture of acrylamide and sodium acrylate.

7. A process of claim 1 wherein the chemical, free-radical initiator is 2,2'-azo-bis(2-methyl propionitrile).

8. A process of claim 1 wherein the chemical, free-radical initiator is 4,4'-azo-bis(4-cyanolvaleric acid).

9. A process of claim 5 wherein the monomer concentration is from about 15% to about 45% by weight.

10. A process of claim 5 wherein the radiation intensity is from 5,000 to 100,000 rads per hour.

11. A process of claim 5 wherein the radiation dose is from 1,000 to 40,000 rads.

12. A process of claim 5 wherein the irradiation is terminated before 90% of the monomer is converted to polymer.

13. A process of claim 12 wherein the monomer concentration is 15% to 45%, the radiation intensity is from 5,000 to 100,000 rads per hour, and the total radiation dose is from 1,000 to 15,000 rads.

14. A process of claim 13 wherein the monomer is a mixture of from 40% to 95% of acrylamide and from 5% to 60% of sodium acrylate and the polymer produced has a Huggins constant of not more than 0.8 and an intrinsic viscosity of at least 5 deciliters per gram in 2 normal sodium chloride at 25.5°C.

* * * * *